United States Patent [19]

McDonald

[11] Patent Number: 5,148,377
[45] Date of Patent: Sep. 15, 1992

[54] COORDINATE MEASURING SYSTEM

[76] Inventor: Gregory J. McDonald, 10/39 Marigold St., Revesby, Australia

[21] Appl. No.: 378,238
[22] PCT Filed: Dec. 10, 1987
[86] PCT No.: PCT/AU87/00420
§ 371 Date: Jun. 12, 1989
§ 102(e) Date: Jun. 12, 1989
[87] PCT Pub. No.: WO88/04404
PCT Pub. Date: Jun. 16, 1988

[30] Foreign Application Priority Data

Dec. 10, 1986 [AU] Australia .................. PH9446

[51] Int. Cl.$^5$ .......................................... G01D 21/00
[52] U.S. Cl. ........................................ 364/560; 33/608; 33/503
[58] Field of Search ........... 33/533, 503, 608, 203.20, 33/203.19, 203.18, 203.17, 203.16, 203.15, 1 MP, 1 PT; 364/560, 559, 474.28, 513

[56] References Cited

U.S. PATENT DOCUMENTS

| | | | |
|---|---|---|---|
| 4,362,977 | 12/1982 | Evans et al. | 364/513 |
| 4,381,548 | 4/1983 | Grossman et al. | 364/559 X |
| 4,432,144 | 2/1984 | Carlsson | 33/608 |
| 4,481,592 | 11/1984 | Jacobs et al. | 364/513 |
| 4,587,622 | 5/1986 | Herzog | 364/561 |
| 4,593,470 | 6/1986 | Davies | 33/1 CC |
| 4,594,670 | 6/1986 | Itoh | 364/513 |
| 4,703,443 | 10/1987 | Moriyasu | 364/559 |
| 4,725,965 | 2/1988 | Keenan | 364/513 |
| 4,856,199 | 8/1989 | Merrill et al. | 33/203.17 |
| 4,891,889 | 1/1990 | Tomelleri | 33/608 X |

FOREIGN PATENT DOCUMENTS 2501361 9/1982 France .................. 33/608

Primary Examiner—Parshotam S. Lall
Assistant Examiner—S. A. Melnick
Attorney, Agent, or Firm—Irell & Manella

[57] ABSTRACT

The coordinate measuring system comprises a device (D) and host computer (19). The device (D) is formed of a base (1) rigidly attached to the article to be measured, an arm (2) rotatable relative to the base (1) only about axis (A), arm (3) rotatable relative to arm (2) only about axis (B), and arm (4) slidably relative to arm (3) along axis (C). The axes (A, B and C) are parallel. At the pivots (5) and (6) and sleeve (7) there are high precision bearings and rotary encoders. The approximate (3D) coordinates corresponding to the position of the measurement probe (10) can be calculated from the encoder derived measurements and are corrected by the computer for inaccuracies due to axes misalignment, flex of components etc. Correction terms are programmed after the assembly of the device (D).

10 Claims, 8 Drawing Sheets

COORDINATE MEASURING SYSTEM

PRIOR ART

Coordinates have long been measured by devices that are little more than a collection of rulers held in convenient relative positions and movable one relative to another with restricted degrees of freedom. In some cases the measurements have been made electronically but accurate readings have necessitated very accurate and therefore expensive constructions which have needed to be very rigid and carefully maintained.

DISCLOSURE OF INVENTION

According to one broad form the present invention provides a coordinate measuring system comprising a device including a plurality of rigid members joined each to another providing a mechanical linkage which has a base end adapted to be fixed relative to an article to be measured and a measurement end movable three-dimensionally about the base end, and measuring signal means producing electrical signals indicative of the relative position or orientation of respective adjoining pairs of rigid members and processing means receiving said signals and calculating therefrom respective three-dimensional coordinate outputs corresponding to the respective positions of the measurement end relative to datum axes fixed relative to the base end and wherein the processing means is correction programmed after assembly of the device so as to electronically correct physical device inaccuracies when calculating said coordinate outputs.

Preferably the plurality of rigid arms comprises first and second arms hinged one to another about a rotational first axis, a third arm secured at a free end of the second arm for translational movement relative thereto along a third axis approximately parallel to the rotational first axis and the first arm being rotatable about the base end about a rotational second axis approximately parallel to the rotational first axis and the physical inaccuracies corrected by the processing means when calculating coordinate outputs include misalignments of the first, second and third axes.

Preferably each signal means is a rotary encoder which produces a pulse for each given angular movement through which the encoder is rotated, the processing means algebraically summing the pulses for each respective encoder and maintaining a set of summed pulsed values, the current set of summed pulsed values representing relative angular displacements of the first arm and the base, second arm and first arm and relative translational displacement of the third arm and second arm, and on demand initiated by a device user the set of summed pulsed values is electronically processed by a mathematical operation by the processing means so as to transform the angular and displacement values into cartesian measured coordinates, the mathematical operation including a transformation mathematically based on a device of predetermined dimensions and exact assembly modified by a current set of error correction terms programmed into the processing means after its assembly and correcting physical device inaccuracies.

Preferably the processing means includes a microprocessor held on board the device and a computer connected thereto for information transfer therewith, the microprocessor maintaining controlled operation of the encoders, receiving encoder pulses and maintaining the set of summed pulsed values, and providing upon request from the computer the current set of summed pulsed values. The computer, as well as carrying out the various mathematical and storage functions required by the system, allows for control inputs to be made by a user of the system.

Preferably the computer maintains current error correction terms and applies the mathematical operation transforming the set of summed pulsed values into measured coordinates.

Preferably the system is correction programmed by a computerized error correction procedure which; receives from said processing means a set of said measured coordinates obtained by measuring the location of respective points, each said measured coordinate belonging to a group of at least two said measured coordinates for which there exists a corresponding known positional relationship between the respective points of the group and at least one of the known positional relationships includes a known finite distance; and optimises said error correction terms so as to minimize the summed discrepancy between the known positional relationship of each group and a corresponding calculated relationship of each of the measured coordinates of the respective group until the summed discrepancy meets a predetermined acceptable level.

Preferably, at least one of said groups comprises measured coordinates of the same point so that the corresponding known positional relationship is zero distance between all respective points of the group, each of the measured coordinates of the group being obtained by measuring the location of the point with said arms of said device in different respective configurations.

Preferably the processing means can extrapolate measured coordinates corresponding to known positions on a previously measured extrapolation tool into a coordinate position of a predetermined point on, or fixed relative to, said extrapolation tool so as to be able to measure the coordinates of a point where direct access by the device is not possible.

Furthermore, the broad invention can be said to provide a method of measuring coordinates defining points on a three-dimensional body relative to a datum set of axes, the method comprising manipulating a coordinate measuring device so as to obtain electrical signals indicative of the position of a measuring end of the device, transforming the signals according to a programme based on the designed geometry of the device and including a set of error correction terms programmed after assembly of the device and electronically correcting physical inaccuracies in the device so as to produce accurate measured coordinates.

An exemplary embodiment of this invention will now be described with reference to the attached illustrations in which.

Figure 1:
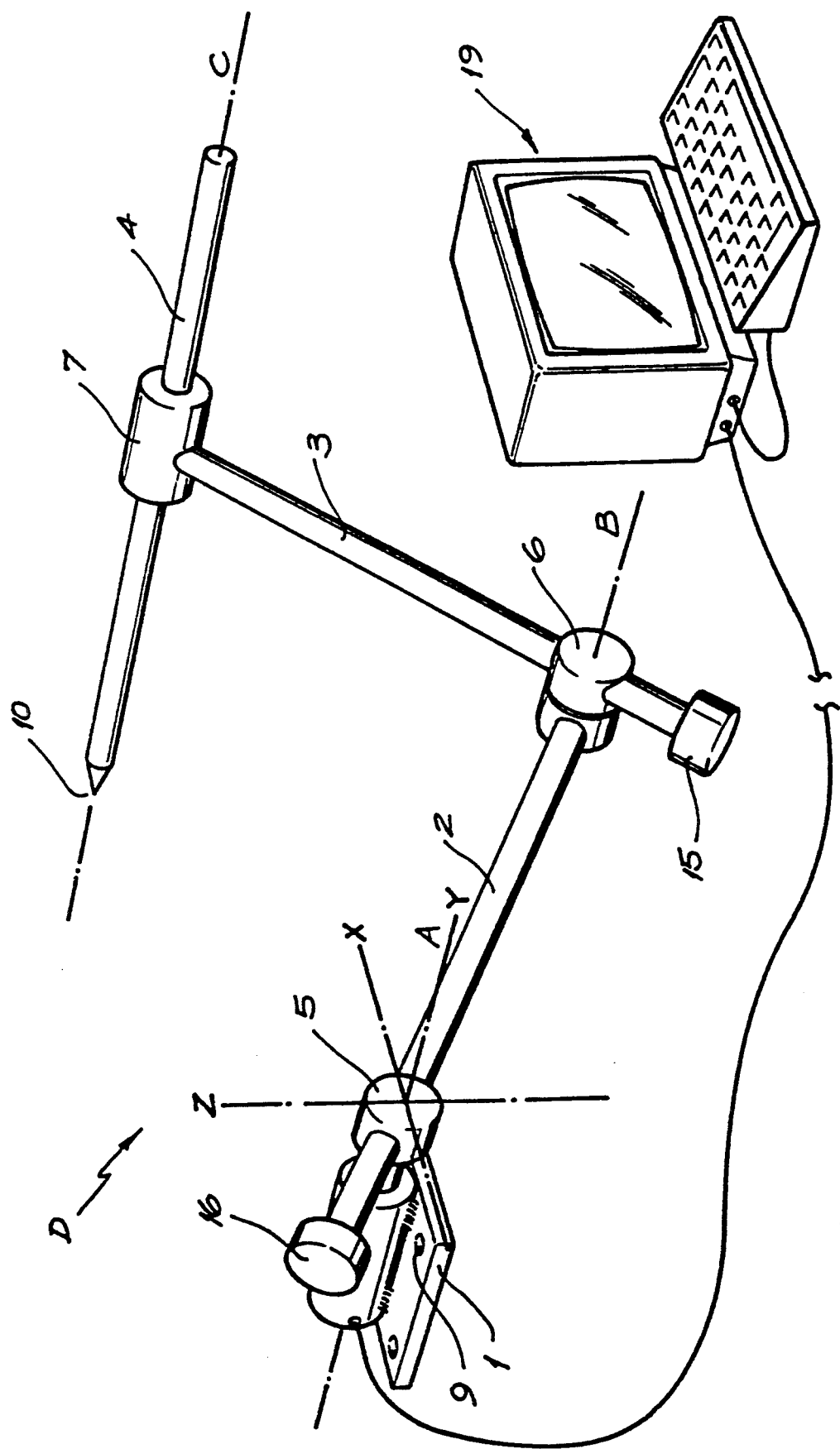
FIG. 1 is a schematic view of a mechanical linkage type coordinate measuring device in accordance with this invention.
Figure 2:
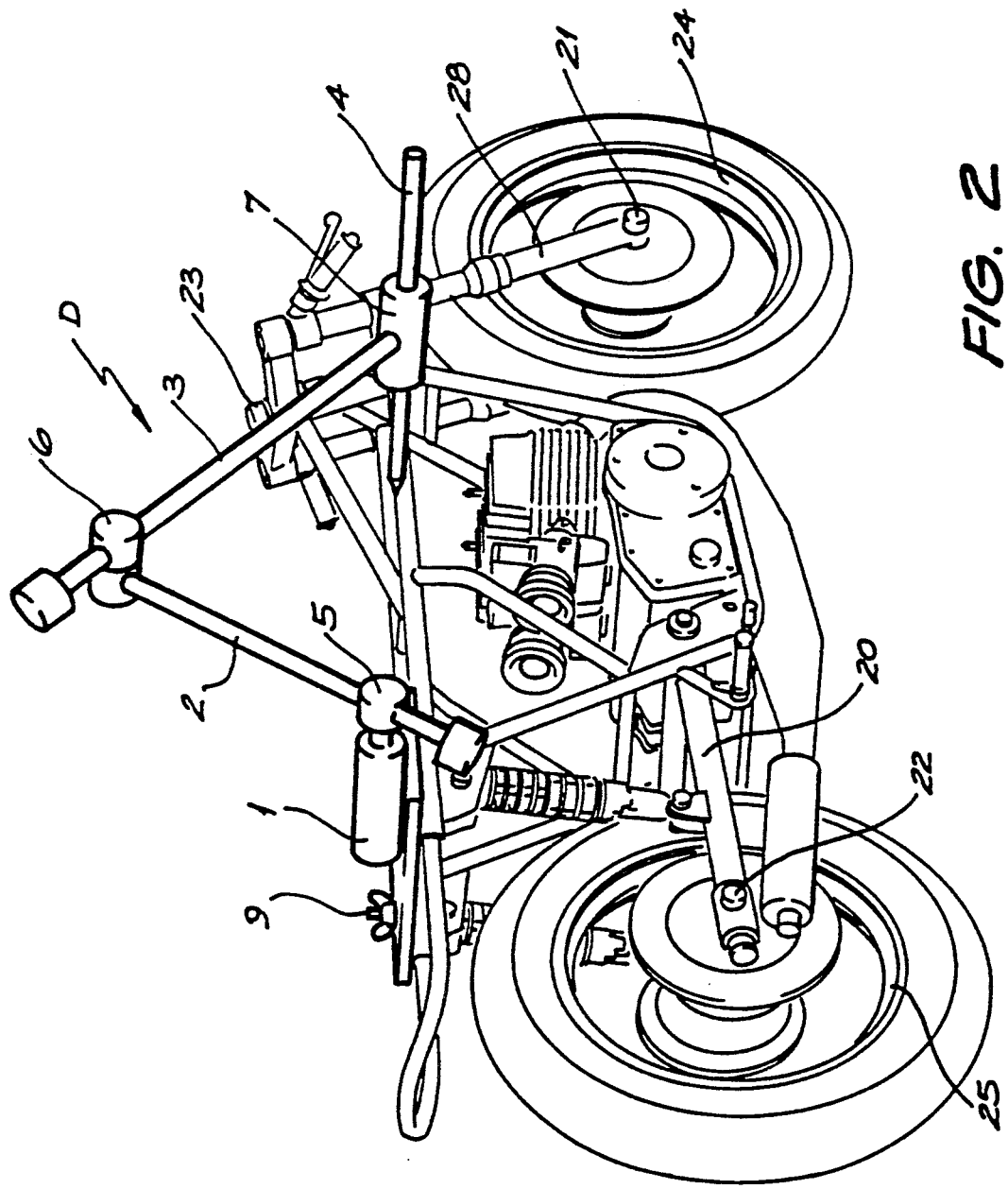
FIG. 2 shows the device of FIG. 1 being used to check the alignment of a motor cycle frame.

The exemplary apparatus of FIG. 1 comprises a base 1 and a set of arms 2 and 3 which are pivotably connected as illustrated by precision bearings 5 and 6 about approximately parallel axes A and B for movement generally in the X-Z plane. Arm 4 is located at the free end of arm 3 and is slidable in the Y direction being approximately parallel to axes A and B within a sleeve 7 and is again held in precision bearings. High resolution rotary encoders are located at the axes A and B for measuring relative rotational movement between base 1 and arm 2 and arms 2 and 3 respectively. A further rotary encoder is driven by a wheel frictionally engaging a surface of arm 3 so that its pulsed output is proportional to the sliding movement of the arm 3 within the sleeve 7. Alternatively a linear encoder, or other suitable accurate linear measuring device, can be used.

Base 1 also includes a clamp assembly 9 which enables this end of the linkage to be rigidly secured to any conveniently accessible part of a body to be measured such as a motor cycle frame or car body/chassis, the positioning being such as to allow extensive movement of the arms 2 and 3 through the X-Z plane. One end of the arm 4 includes a probe point 10 which is adapted to be accurately placed at the points of which their coordinates are to be measured.

The device includes a microprocessor board (not shown) which is conveniently positioned within the base 1. The microprocessor board receives pulses from each of the rotary encoders upon their rotation. Each pulse received from an encoder indicates a given angular movement. A typical encoder suited to high accuracy embodiments of the invention produces $10^6$ pulses per revolution.

The microprocessor maintains a sum of the respective pulses from each of the encoders and relays the sums of pulses to the host computer 19 on request by the computer 19. As well as the task of receiving encoder pulses and maintaining a set of summed pulses the microprocessor provides required services for the electronic components of the measuring device such as the rotary encoders. The microprocessor also mediates communications between the host computer 19, the user of the measuring device, and the electronic hardware within the various arms 2-4 and base 1.

The exemplary embodiment uses an IBM compatible computer, but other machines of similar capacity could well be programmed for the purpose.

The exemplary embodiment is programmed to examine the frame and suspension geometry of a motor cycle so as to determine if there are any misalignments or misadjustments that require correcting in order to ensure correct and safe vehicle operation. Although of particular importance after an accident these checks can also be advantageously performed during original production so as to correctly make original settings of adjustable components. Further, after original production and throughout the life of the vehicle, these adjustments can be re-checked and recalibrated where necessary.

By leading probe point 10 about the motor cycle the system obtains the coordinates of the points of interest including points on the swing arm 20, front and rear axles 21 and 22, steering head 23 and front and rear wheel rims 24 and 25. Many of the points are measured in various positions such as wheel rotation positions for the wheel rims. The coordinates and orientation of pivot axes such as the axis of the steering head 23 can be accurately obtained by measuring a point that pivots around the axis, such as one end of the front axle 21, in a number (at least three) of steering orientations. By mathematical calculation the computer 19 obtains the centre of that points rotation and thus the axis of the steering head 23.

The main alignment obtained by the prior art is the wheels being in the one plane and central to the bike with the steering orientation straight ahead, but it is also very important that the rear axle 22 is parallel with the axis of the swing arm 20 and that the axis of the steering head 23 is in the vertical plane of the bike and at the correct angle of rake, the front forks 28 straight and aligned parallel with the steering head 23 (except in the case of some bikes with offset triple clamps), the front axle 22 positioned correctly in the front forks 28 and trueness of the wheel rims. All of these alignments are checked and a report given in the form of FIGS. 4 to 7.

Figure 4:
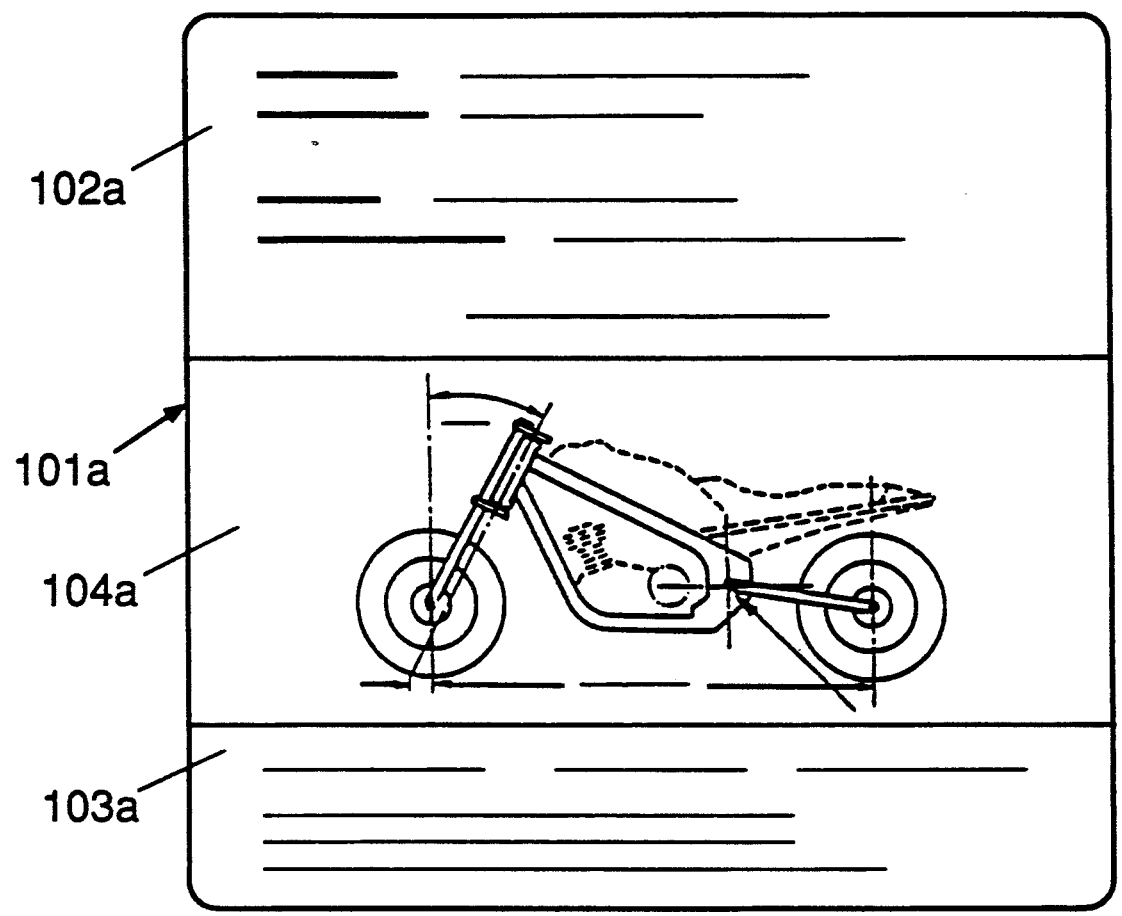
FIGS. 4 to 7 show outputs produced by an embodiment of the invention indicating various frame dimensions of a hypothetical motor cycle frame having been measured as shown and described with reference to FIG. 2.

FIGS. 4–7 in combination, is an example of a diagrammatic report compiled by the invention. Each individual FIGS. 4–7 includes within a display frame 101: an explanatory picture section 104, an identification header section 102, and a measured data section 103. Generally, picture section 104n represents, in a certain view, a motorcycle and includes explanatory text and/or axes referred to in the adjoining data section 103n. Each data section 103n includes measurement results in respect of preselected parameters, such as wheel offset from the bike's center line. Each header section 102n, identifies the view of the motorcycle shown in the adjoining picture section 104n; "n" being a placeholder for indices a, b, c, and d. FIG. 4 being the Side View (reference number index "a"), FIG. 5 being the Top View (reference number index "b"), FIG. 6 being the Front View (reference number index "c"), and FIG. 7 being the Rear View (reference number index "d").

FIG. 4 indicates the primary parameter measurements within measured data section 103a, including wheel base, rake and trail and it includes the actual bike identification data in header section 102a, such as bike model and frame number.

Figure 5:
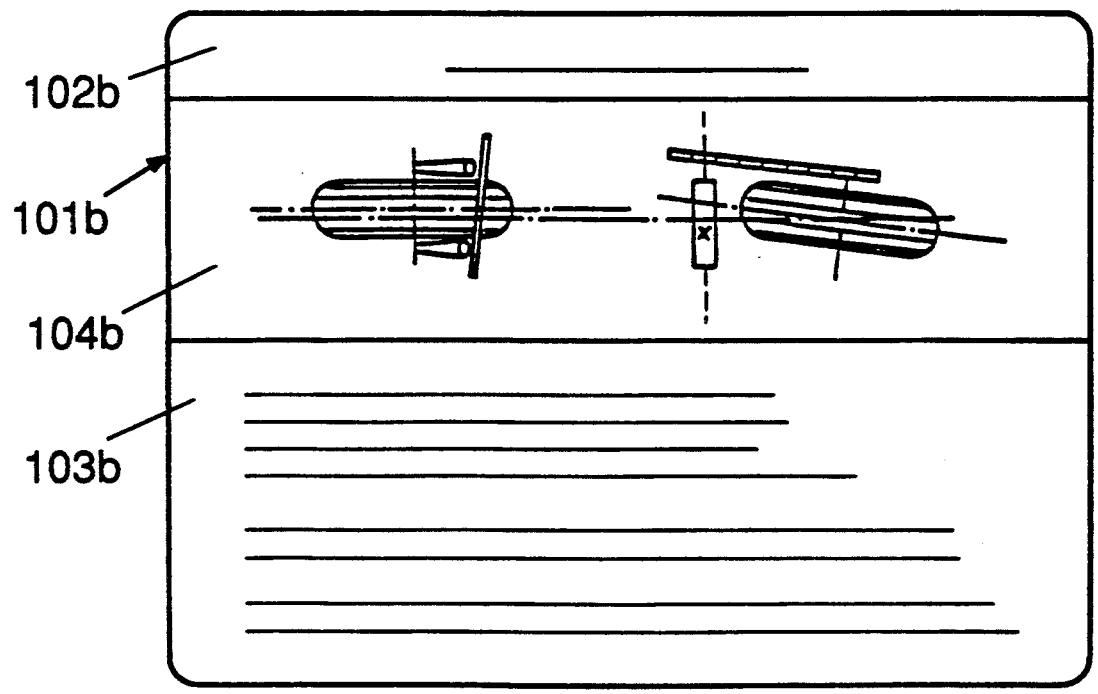
Figure 6:
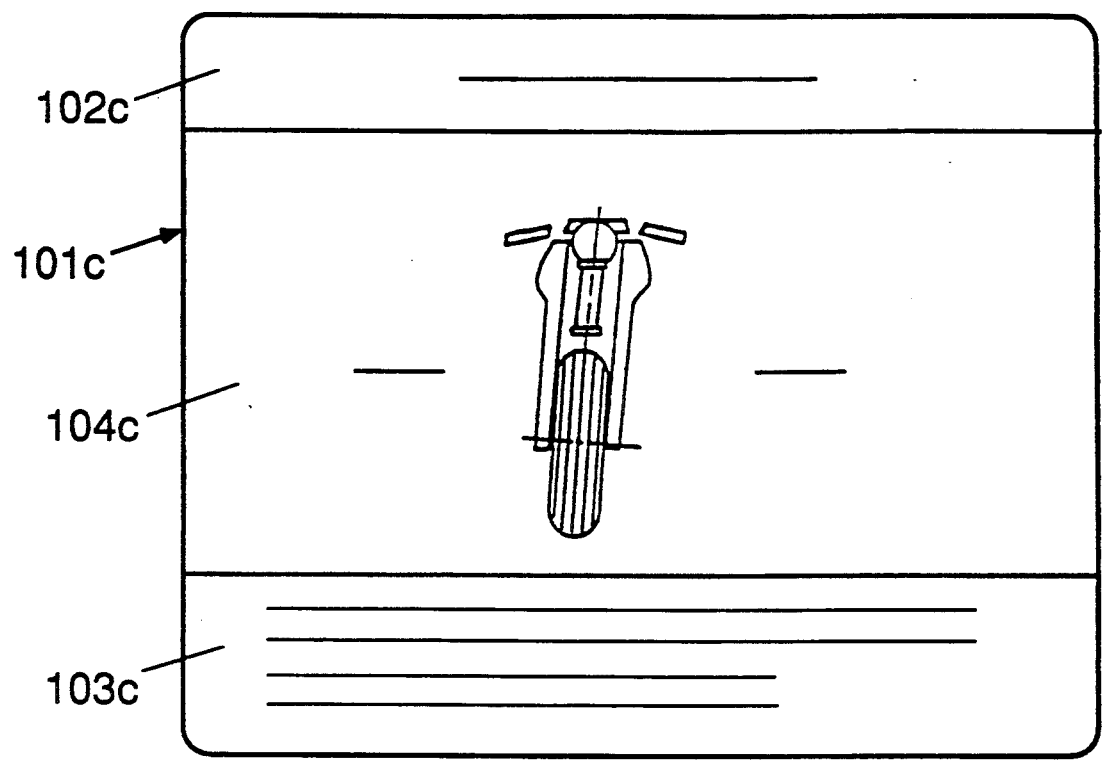
Figure 7:
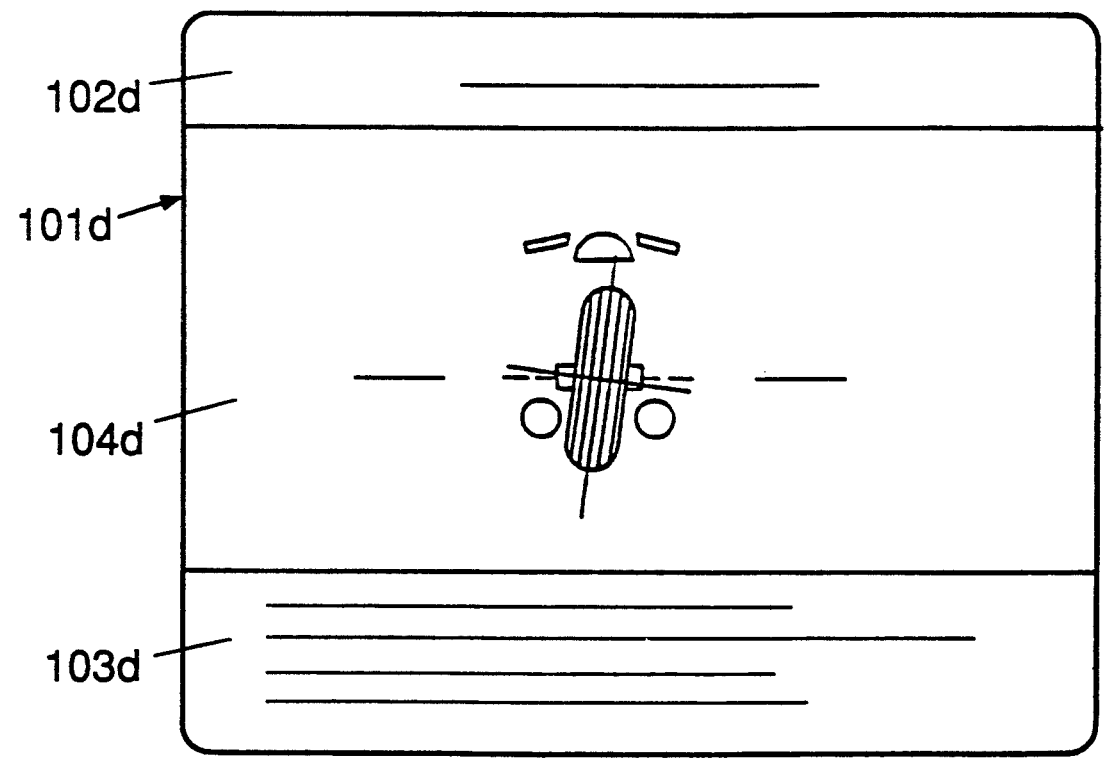

FIG. 5 having window sections carrying reference index "b", provides measurements relating to the front-back alignment of the wheels relative to a datum axis;

FIG. 6 having window sections carrying reference index "c" provides measurements relating to the vertical alignment of the front wheel relative to a datum axis; and FIG. 7, having window sections carrying reference index "d", provides measurements relating to the vertical alignment of the rear wheel relative to a datum axis.

Trueness of disc brake rotors can also be obtained. Furthermore, as seen in FIG. 5 the systems indicates the required correction in linear terms in order to correct rear wheel angular misalignment.

This system obtains its required high degree of accuracy by electronically correcting inaccuracies in the physical measuring device D so as to take into account misalignments and assembly inaccuracies which are bound to occur in its manufacture. If assembled perfectly the axes A, B and C would be all exactly parallel, their spaced distance known exactly and be constant for all temperatures and the structure perfectly rigid. This perfection can of course not be obtained and furthermore the alignments of the components might be altered during its life, for example, by accidental damage, wear, or ageing of its components.

In order to correct these possible inaccuracies the host computer 19 is programmed after assembly of the measuring device D is completed so as to store within computer 19 a set of error terms. The error terms are used whenever the computer 19 transforms the angular and displacement terms represented by the summed pulse values for a particular point into cartesian coordinates, by modifying the mathematical operation of the transform. The error terms are obtained as follows and as outlined in the flow chhhart of FIG. 9.

Figure 3:
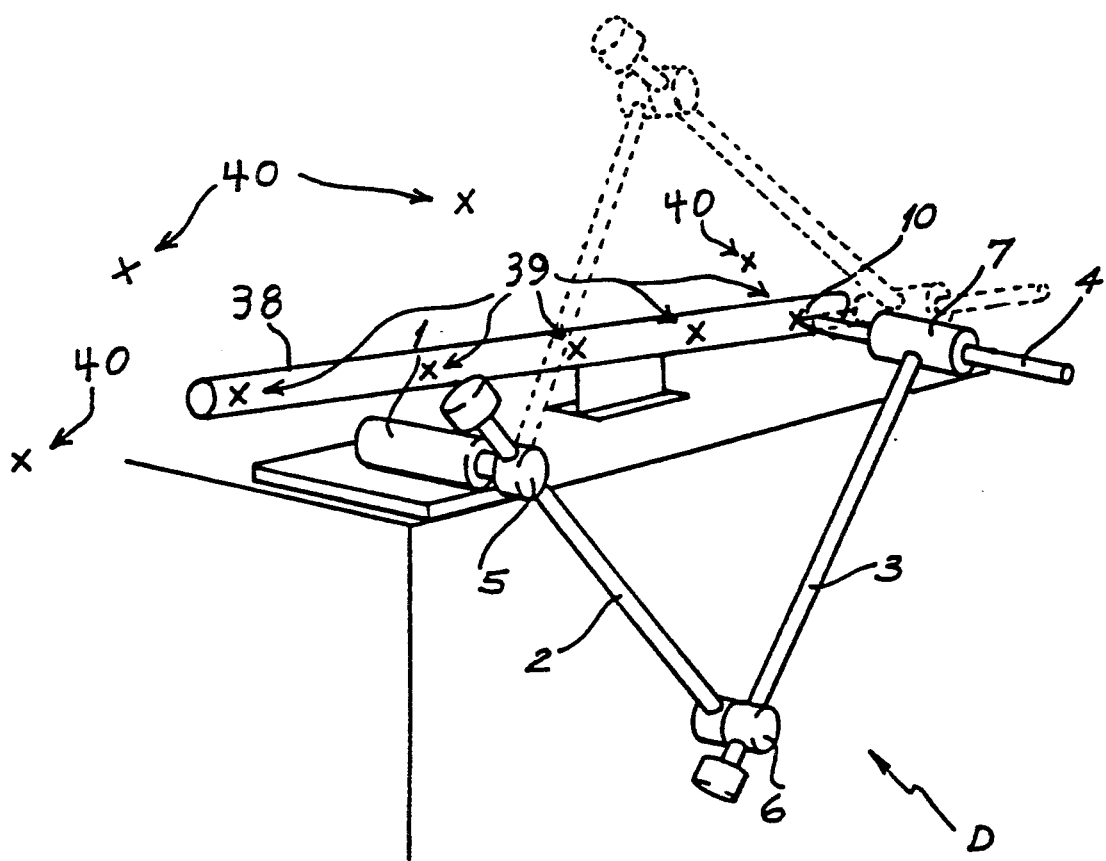
FIG. 3 shows the device of FIG. 1 being initially error corrected in accordance with a preferred feature of the present invention.

A rigid bar 38 is fixed relative to the base 1 of the measuring device D. On the bar are a number of predefined test points 39, the distance between the various points 39 having been accurately measured beforehand. The value of the distances between the various predefined test points 39 is entered into an Error Correction Procedure (ECP) programmed computer which can be the host computer 19, depending upon its capacity, or a separate machine. The probe 10 is then serially positioned on all of the test points 39 as well as a number of further test points 40 which are any convenient relocatable point in space (e.g. arbitrary marked points on a nearby surface). When the probe 10 is positioned at each point 39 or 40 the host computer 19 obtains the current summed pulsed values of the three encoders and transforms them into cartesian measured coordinates in the usual manner. Each of the points 39 and 40 is measured twice, once with the arms 2 and 3 in the "up" position (shadowed) and once in the "down" positioned (solid) as seen in FIG. 3.

Thus, a set of measured coordinates is obtained for which there are known positional relationships between the respective points of those measured coordinates. The set comprises a number of pairs of measured coordinates in which the two measured coordinates of each pair represent the same point, their known positional relationship is zero distance to the other member of the same pair. Additionally, some of the pairs of measured coordinates (corresponding to the points 39) represent points which are a known distance from other such pairs and their known positional relationship additionally includes the distances separating their corresponding point 39 from other known points 39. The ECP then proceeds by comparing the measured coordinates of each pair with respect to their known positional relationship, for all pairs this is done by calculating a value of the discrepancy between the two measured coordinates of the pair, ideally the discrepancy would be zero because their positional relationship is one of zero distance between their corresponding points. In the case of pairs corresponding to ones of the points 39, their known positional relationships include the corresponding distances separating them from other pairs corresponding to other known oints 39, thus, discrepancies in the calculated difference between measured coordinates of two such pairs and their corresponding known distance apart on the bar 38 can be calculated. The error terms currently in use by the computer 19 are then optimised by the ECP so as to minimise the summed discrepancy in the measured coordinates, when compared with their known positional relationships, to be within a predetermined acceptable accuracy level.

Figure 9:
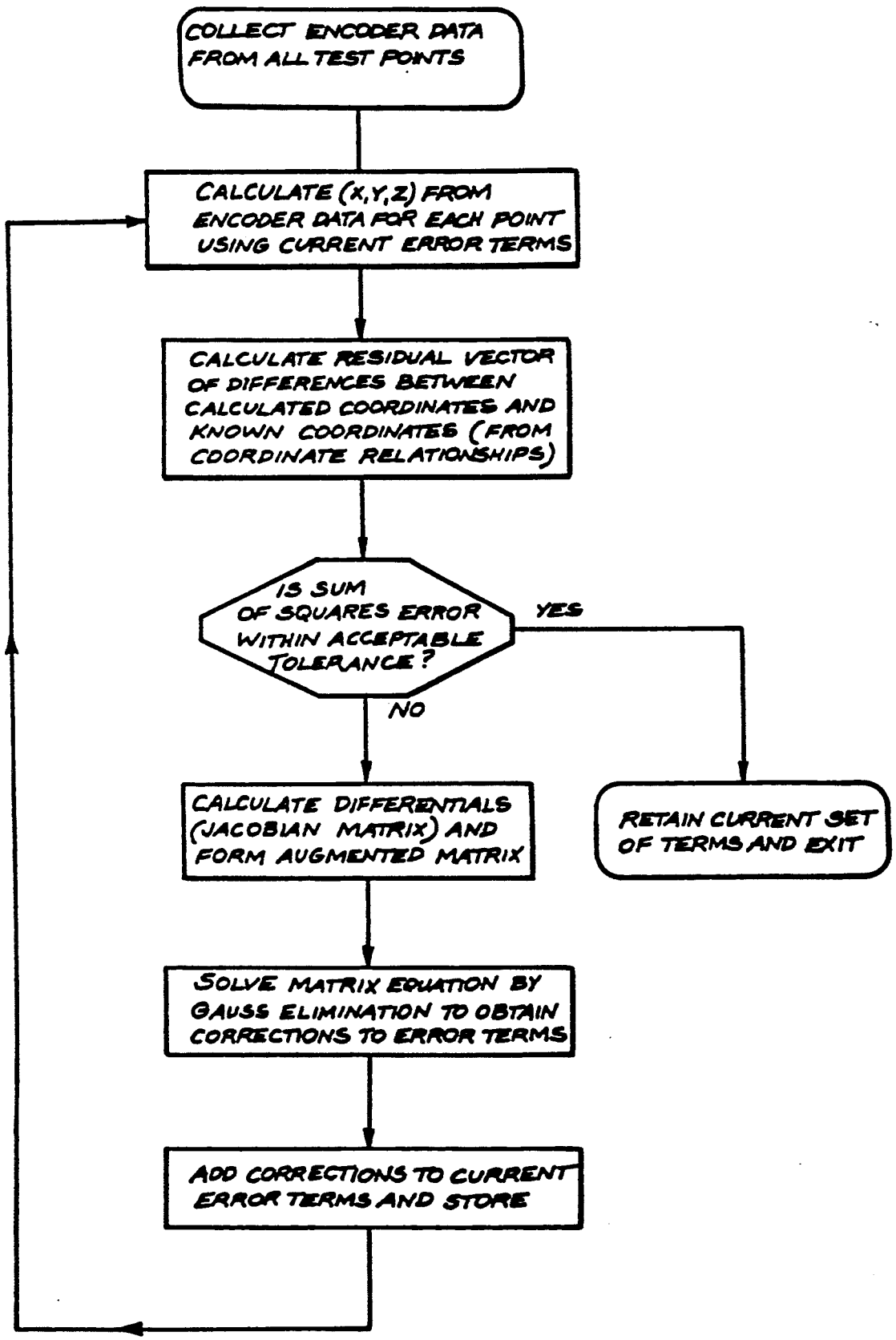
FIG. 9 is a flow chart showing the logical steps of the error correction procedure of the exemplary embodiment.
Figure 10:
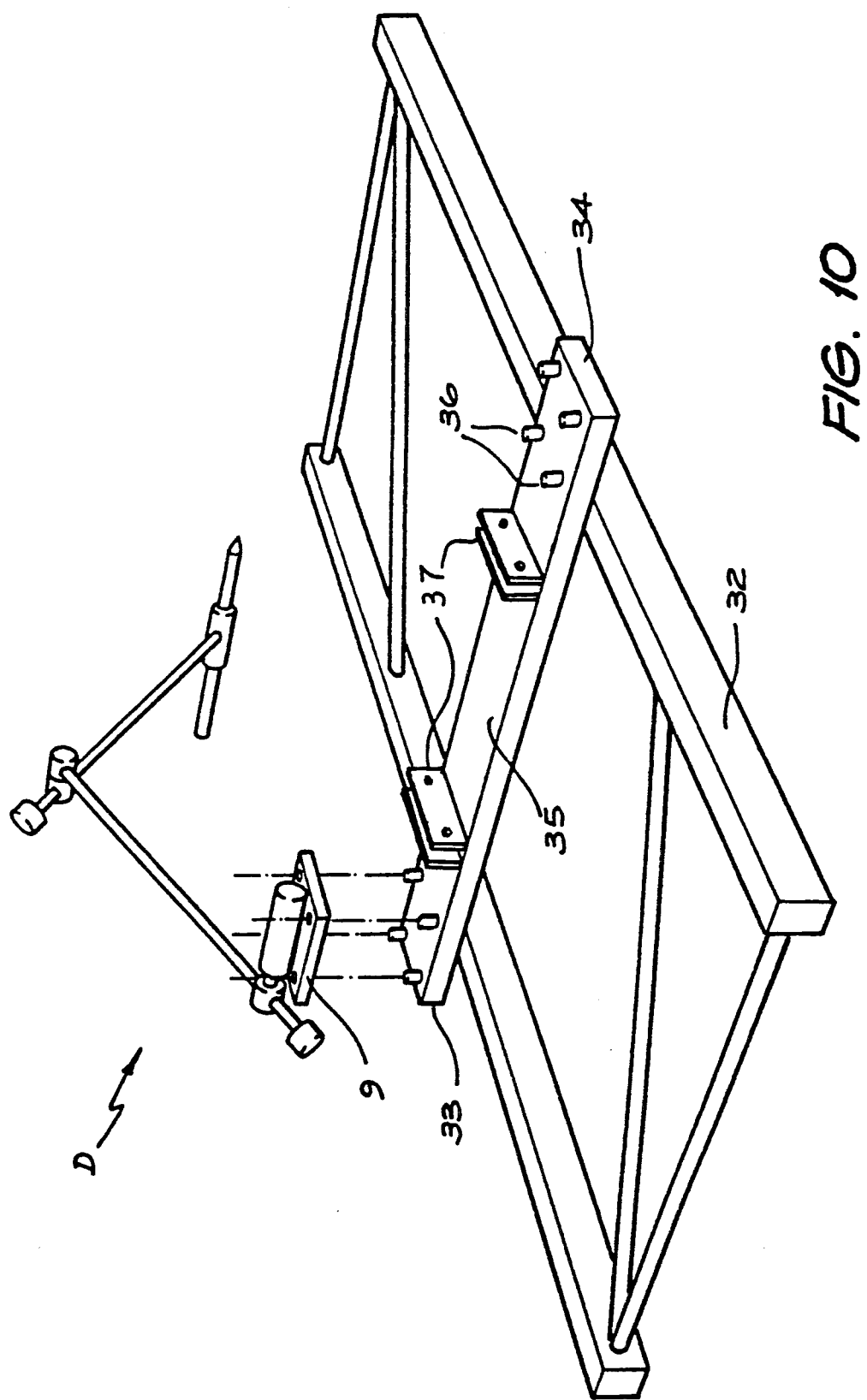
FIG. 10 is a perspective view of parts of an alternative embodiment used in repairing accident damaged motor cars.

Although the mathematical operations cited in FIG. 9 have not been described fully they will be familiar to the skilled mathematician, for example, see Method of Linear Approximation in the text "Numerical Methods for Nonlinear Regression" B. R. Sadler, University of Qld. Press, 1975.

In the case of a motor car front suspension and steering system, this invention can be used to find the rotational axis of all of the major components thus allowing wheel alignment to be obtained dynamically for all suspension/steering positions, rather than just in a static manner for only a very restricted range of positions. Thus all required corrections to be made in, e.g. accident damaged vehicles, can be obtained and correct alignment produced for all steering/suspension positions.

As well as aligning steering systems of motor cars the coordinate measuring system is also well adapted to measuring the coordinates of predetermined points on the car so as to determine e.g., the extent of accident damage. In straightening accident damaged motor cars a schedule of predetermined points and their coordinates relative to some datum on the car, as provided by the original manufacturer or prepared from an undamaged car of the same model, is followed and the actual coordinates of the points compared with those of the schedule. The car is already positioned on a chassis straightening device 32, well known in the field and resembling a rack type frame adjusted to grasp portions of the car and push, pull and twist as required the car portions so as to bring the body/chassis into correct alignment.

By determining the magnitude of the displacement of the predetermined points from their correct position the required pushing/pulling/twisting can be ascertained, carried out and then the result checked.

The predetermined points will include points on both sides of the motor car and either two devices D can be clamped each one to a respective side of the chassis/body (or chassis straightening device as desired) or one device D can be transferred from one side, after completing measurements on that side, to the opposite side. In the case where the device D is transferred one side to the other the clamping device 9 is adapted to be quickly and accurately attached to either end 33, 34 of a rigid beam 35 by means of e.g., spigots 36. The rigid beam 35 is itself clamped to the car body/chassis by clamps 37. The rigid beam is produced in material of very low coefficient of thermal expansion such as carbon fibre reinforced plastics. The computer 19 is programmed with the relative positions of the device D for the two ends 33 and 34 so that no recalibration is required when changing sides.

Figure 8:
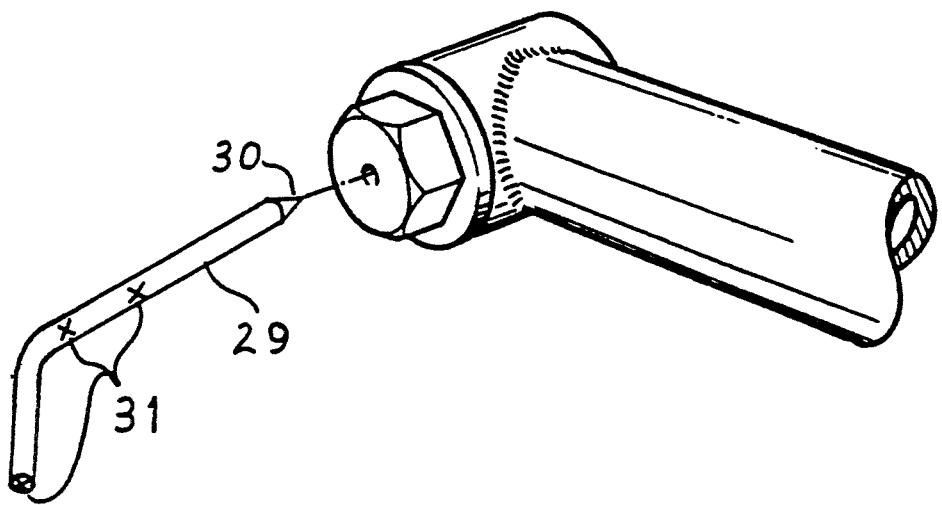
FIG. 8 shows an article conveniently used in cooperation with the device of FIG. 1 for coordinate measurement of points of difficult access.

When a point which is not directly accessible to the probe 10 is to be measured, extrapolation tool 29 is used, see FIG. 8. The tool 29 is rigid and includes measuring point 30 and three (in some cases two) extrapolating points 31. By firstly measuring the relative positions (coordinates) of the points 30 and 31, conveniently with the measuring device D, then rigidly fixing the tool 29 with point 30 against the point to be measured and lastly, measuring the coordinates of the points 31 relative to the desired datum axes, the required coordinates of the inaccessible point are obtained mathematically by computer 19.

Although described with reference to a particular embodiment developed to measure motor cycle frame/suspension alignment, this system is well suited to many alignment measuring tasks such as dual steering heavy vehicles and wheels of rail stock, also in an embodiment programmed for the tasks, the invention will accurately measure robot arm locations and is therefore well adapted to modern automated production lines as well as general coordinate measuring tasks.

I claim:

1. A three-dimensional coordinate measuring system comprising an articulated device including a base member adapted to be fixed to, or relative to, a body relative to which coordinates are to be measured, a first arm rotatable about a first axis relative to the base, a second arm rotatable about a second axis relative to the first arm, a third arm slidingly engaged to said second arm along a third axis, said first, second and third axes being approximately parallel, first second and third electrical pulse generating rotary encoders two of which respectively measuring rotary displacement of the first arm about the base and the second arm about the first arm and the third encoder being driven by a wheel frictionally engaging the third arm with the encoder fixed within the second arm so as to measure relative translation of the third arm relative to the second arm, and a microprocessor held within the base and programmed to collect and retain a set of summed pulsed values being the algebraic sum of pulses initiated by the three rotary encoders since their last initiation, the system further including a host computer communicating with the microprocessor and obtaining therefrom upon request by the host computer, when initiated by a user of the system, the current set of summed pulses values, performing on the set of summed pulsed values a mathematical transformation so as to produce an output being the coordinates of a probe end of the third arm at the time of request of the set of summed pulsed values and wherein the mathematical transformation is modified by a set of error terms so as to produce a coordinate output being electronically corrected in order to correct inaccuracies resulting from non-perfect construction of the articulated device.

2. A coordinate measuring system comprising a device including a plurality of rigid members each attached to another providing a mechanical linkage which includes a base adapted to be fixed relative to an article to be measured and a measurement end movable to points in at least two configurations of the mechanical linkage three-dimensionally about the base, and measuring signal means producing electrical signals indicative of the relative position or orientation of respective adjoining pairs of rigid members, and processing means for receiving said signals, maintaining a set of signal values indicating relative positions or orientations of adjoining pairs of rigid members, and on demand initiated by a device user the set of signal values for electronically processing by a mathematical operation by the processing means so as to transform the values into measured coordinates, the mathematical operation including a transformation modified by a set of programmable error terms, a rigid elongate beam rigidly fixable relative to a body to be measured so as to extend respective ends of the beam beyond, or proximal to, respective extremities of the body in at least one dimension thereof and including locating means, one at each respective end of the beam, cooperative with the base of the device so as to provide removable fixing of the base at accurately reproducible locations at both ends of the beam, and the processing means being programmed with the relative position of the base in both locations so as to allow use of the system with the base in either location without the need to realign or calibrate the system.

3. A three-dimensional coordinate measuring system comprising an articulated device including a base member adapted to be fixed to, or relative to, a body relative to which coordinates are to be measured, a first arm rotatable about a first axis relative to the base, a second arm rotatable about a second axis relative to the first arm, a third arm slidingly engaged to said second arm along a third axis, said first, second and third axes being approximately parallel, first second and third electrical pulse generating rotary encoders two of which respectively measuring rotary displacement of the first arm about the base and the second arm about the first arm and the third encoder being driven by a wheel frictionally engaging the third arm with the encoder fixed within the second arm so as to measure relative translation of the third arm relative to the second arm, and a microprocessor held within the base and programmed to collect and retain a set of summed pulsed values being the algebraic sum of pulses initiated by the three rotary encoders since their last initiation, the system further including a host computer communicating with the microprocessor for obtaining therefrom upon request by the host computer, when initiated by a user of the system, the current set of summed pulsed values, performing on the set of summed pulsed values a mathematical transformation so as to produce an output being the cartesian coordinates of a probe end of the third arm at the time of request of the set of summed pulsed values and wherein the mathematical transformation includes a general transformation, based on an articulated device of predetermined perfect dimensions and alignments, and a set of error terms so as to produce cartesian coordinate output being electronically corrected in order to correct inaccuracies resulting from non-perfect construction of the articulated device.

4. A coordinate measuring system comprising a device including a plurality or rigid members joined each attached to another providing a mechanical linkage which includes a base adapted to the fixed relative to an article to be measured and a measurement end movable three-dimensionally about the base, and measuring signal means producing electrical signals indicative of the relative position or orientation of respective adjoining pairs of rigid members and processing means receiving said signals, maintaining a set of signal values indicating relative positioning of adjoining pairs of rigid members, and on demand initiated by a device user the set of signal values is electronically processed by a mathematical operation by the processing means so as to transform the values into measured coordinates, the mathematical operation including a transformation with terms mathematically based on a device of predetermined nominal dimensions and assembly and with a current set of error terms programmed into the processing means after its assembly and correcting for physical device inaccuracies, wherein the plurality of rigid members comprises first and second arms hinged one to another about a rotatable first axis, a third arm secured at a free end of the second arm for translational movement relative thereto along a third axis approximately parallel to the rotational first axis and the first arm being rotatable about the base about a rotational second axis approximately parallel to the rotational first axis and the physical inaccuracies corrected by the processing means when calculating coordinate output include misalignments of the first, second and third axes, wherein each signal means producing electrical signals is a rotary encoder which produces a pulse for given angular movement through which the encoder is rotated, the processing means algebraically summing the pulses for each respective encoder to produce said signal values, and further including a rigid elongate beam rigidly fixable relative to a body to be measured so as to extend respective ends of the beam beyond, or proximal to, respective extremities of the body in at least one dimension thereof and including locating means, one at each respective end of the beam, cooperative with the base of the device so as to provide removable fixing of the base at accurately reproducible locations at both ends of the beam, and the processing means being programed with the relative position of the base in both locations so as to allow use of the system with the base in either location without the need to realign or calibrate the system.

5. A method of error correction programming a coordinate measuring system, the system comprising a device including a plurality of rigid members each attached to another providing a mechanical linkage which includes a base adapted to be fixed relative to an article to be measured and a measurement end movable to points in at least two configurations of the mechanical linkage three-dimensionally about the base, and measuring signal means producing electrical signals indicative of the relative position or orientation of respective adjoining pairs of rigid members, and processing means receiving said signals, maintaining a set of signal values indicating relative positions or orientations of adjoining pairs of rigid members, and on demand initiated by a device user the set of signal values is electronically processed by a mathematical operation by the processing means so as to transform the values into measured coordinates, the mathematical operation of the transform being modified by a set of programmable error terms, the method comprising the steps of:

locating the measurement end serially at a plurality of points in at least two machine configurations of the mechanical linkage for at least one point and at least two of the points being separated by an accurately known distance;

at each point, and in each configuration, obtaining from the processing means a set of measured coordinates corresponding to said point using a current set of error terms;

grouping each measured coordinate into groups of at least two measured coordinates for which there exists a corresponding known positional relationship between the respective points of the same group including at least one group wherein the known positional relationship is said accurately known distance and at least one group representing a common point measured in at least two machine configurations wherein the known positional relationship is zero distance;

mathematically optimizing the error terms so as to minimize the summed discrepancy between the known positional relationship of each group and a corresponding calculated relationship of the measured coordinates of the group; and programming the optimized error terms into the processing means so as to define the current set of error terms.

6. The method of claim 5 wherein at least two of the plurality of points are predefined test points on a rigid bar and at least a further one of the plurality of points is a further test point being a relocatable point on a surface off the bar, and the step of locating the measurement end at the plurality of points includes locating the measurement end in at least two machine configurations at least one of the predefined test points and further test points.

7. A coordinate measuring system comprising a device including a plurality of rigid members each attached to another providing a mechanical linkage which includes a base adapted to be fixed relative to an article to be measured and a measurement end movable to points in at least two configurations of the mechanical linkage three-dimensionally about the base, and measuring signal means producing electrical signals indicative of the relative position or orientation of respective adjoining pairs of rigid members, and processing means receiving said signals, maintaining a set of signal values indicating relative positions or orientations of adjoining pairs of rigid members, and on demand initiated by a device user the set of signal values is electronically processed by a mathematical operation by the processing means so as to transform the values into measured coordinates, the mathematical operation including a transformation using mathematical parameters based on nominal dimensions and alignments of the rigid members and modified by a set of programmable error terms, wherein the error terms modify the transform so as to minimize the summed discrepancy between calculated positional relationships of measured coordinates and their corresponding and actual positional relationship.

8. A coordinate measuring system as defined in claim 7, wherein the processing means extrapolates measured coordinates corresponding to known positions on a previously measured extrapolation tool into a coordinate position of a predetermined point on, or fixed relative to, said extrapolation tool, whereby said processing means mathematically obtains the coordinates of said predetermined point on the extrapolation tool from the measured coordinates of said known positions on the extrapolation tool while fixed in space and the relative positions of said known positions on the extrapolation tool having been previously measured.

9. The coordinate measuring system of claim 7 wherein the plurality of rigid arms comprise first and second arms hinged one to another about a rotational first axis, a third arm secured at a free end of the second arm for translational movement relative thereto along a third axis approximately parallel to the rotational first axis and the first arm being rotatable about the base about a rotational second axis approximately parallel to the rotational first axis.

10. The coordinate measuring system of claim 9 wherein the relative translational location of the third arm and the second arm is measured by a rotary encoder driven by a friction wheel engaging an outer surface of said third ar, the rotary encoder being fixed to said second arm.

* * * * *